Figure 1:
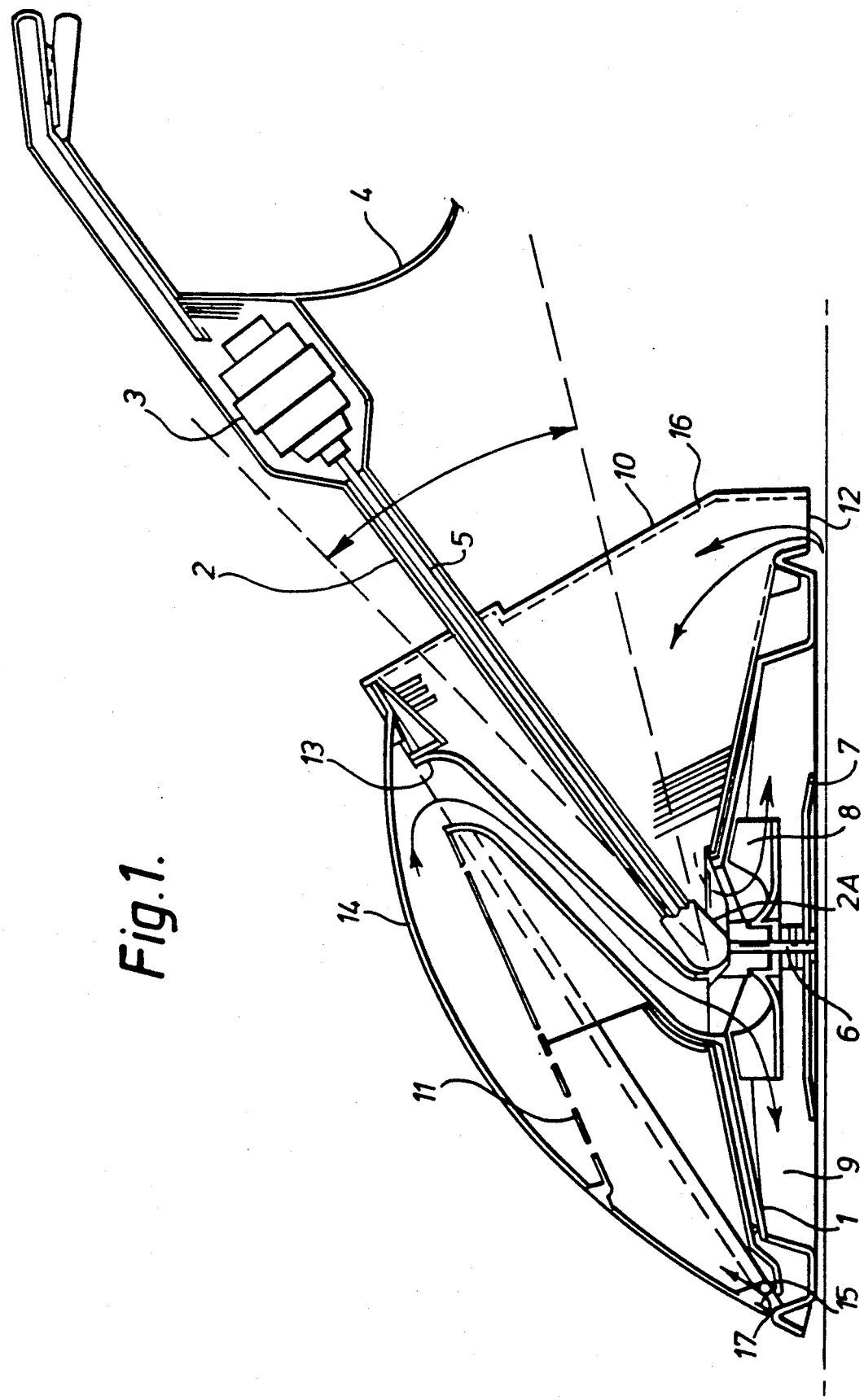

United States Patent [19]
Dunn

[11] Patent Number: 5,113,642
[45] Date of Patent: May 19, 1992

[54] LAWN MOWERS

[75] Inventor: Ken Dunn, Darlington, United Kingdom

[73] Assignee: Electrolux Northern Limited, Newton Aycliffe, England

[21] Appl. No.: 686,584

[22] Filed: Apr. 17, 1991

[30] Foreign Application Priority Data

Apr. 17, 1990 [GB] United Kingdom ............... 9008569

[51] Int. Cl.⁵ .................................. A01D 53/00
[52] U.S. Cl. ..................................... 56/12.8
[58] Field of Search ............... 56/12.8, 13.3, 13.4, 56/10.8; 180/116-119

[56] References Cited

U.S. PATENT DOCUMENTS

| | | | |
|---|---|---|---|
| 3,110,996 | 11/1963 | Dahlman | 56/12.8 |
| 3,298,163 | 1/1967 | Ottosen et al. | 56/12.8 X |
| 3,838,558 | 10/1974 | Goodchild | 56/12.8 |
| 5,048,275 | 9/1991 | Fassauer | 56/12.8 |

Primary Examiner—Thuy M. Bui
Attorney, Agent, or Firm—Pearne, Gordon, McCoy & Granger

[57] ABSTRACT

This invention relates to grass cutting appliances. In particular a grass cutting appliance in the form of a lawn mower comprises a hood, a cutting member for rotation in a substantially horizontal plane within the hood, a handle for controlling directional movement of the appliance during a cutting operation, a power source disposed remotely from the cutting member and supported from the handle, and a drive line for drivingly connecting the power source and the cutting member.

14 Claims, 11 Drawing Sheets

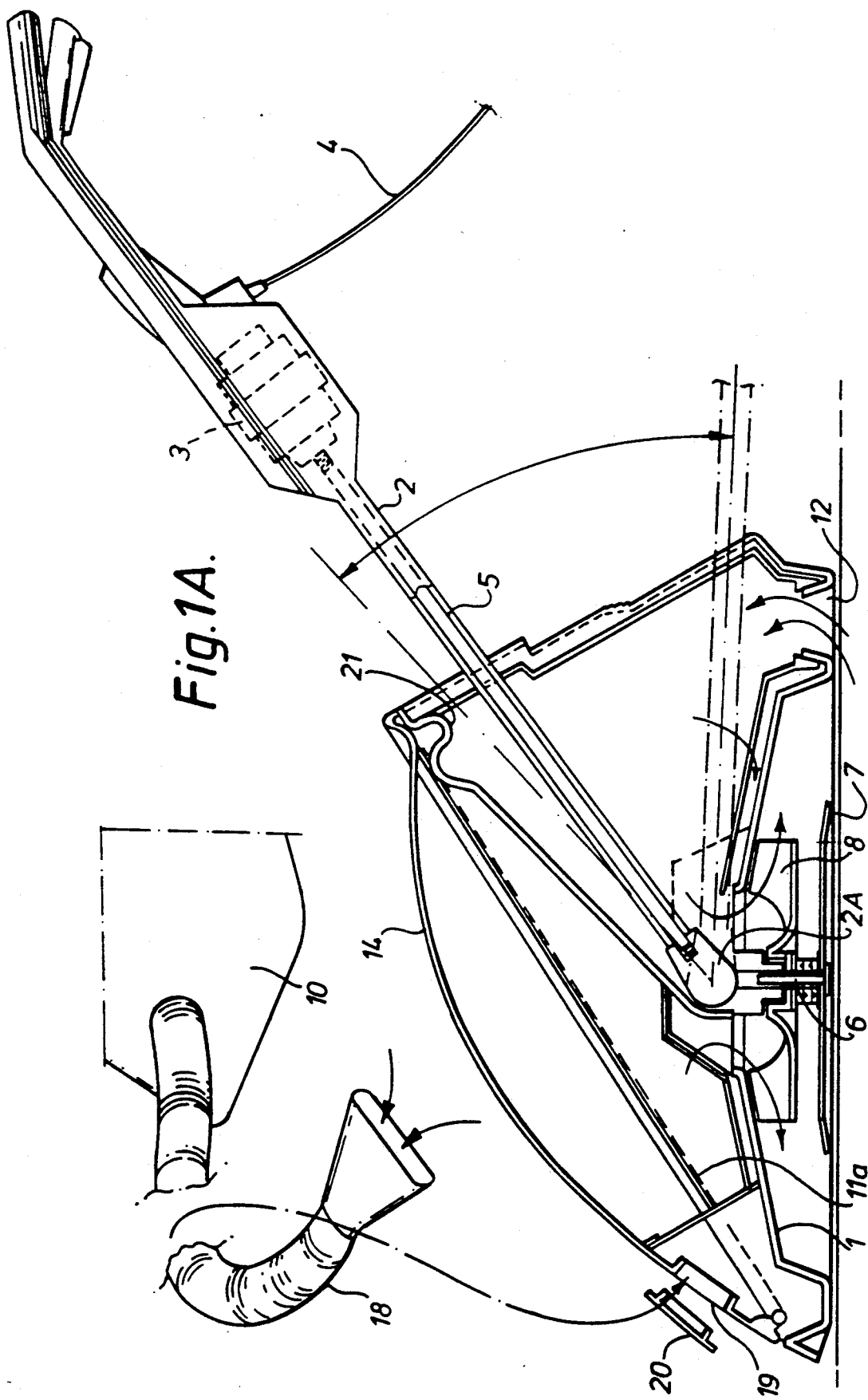

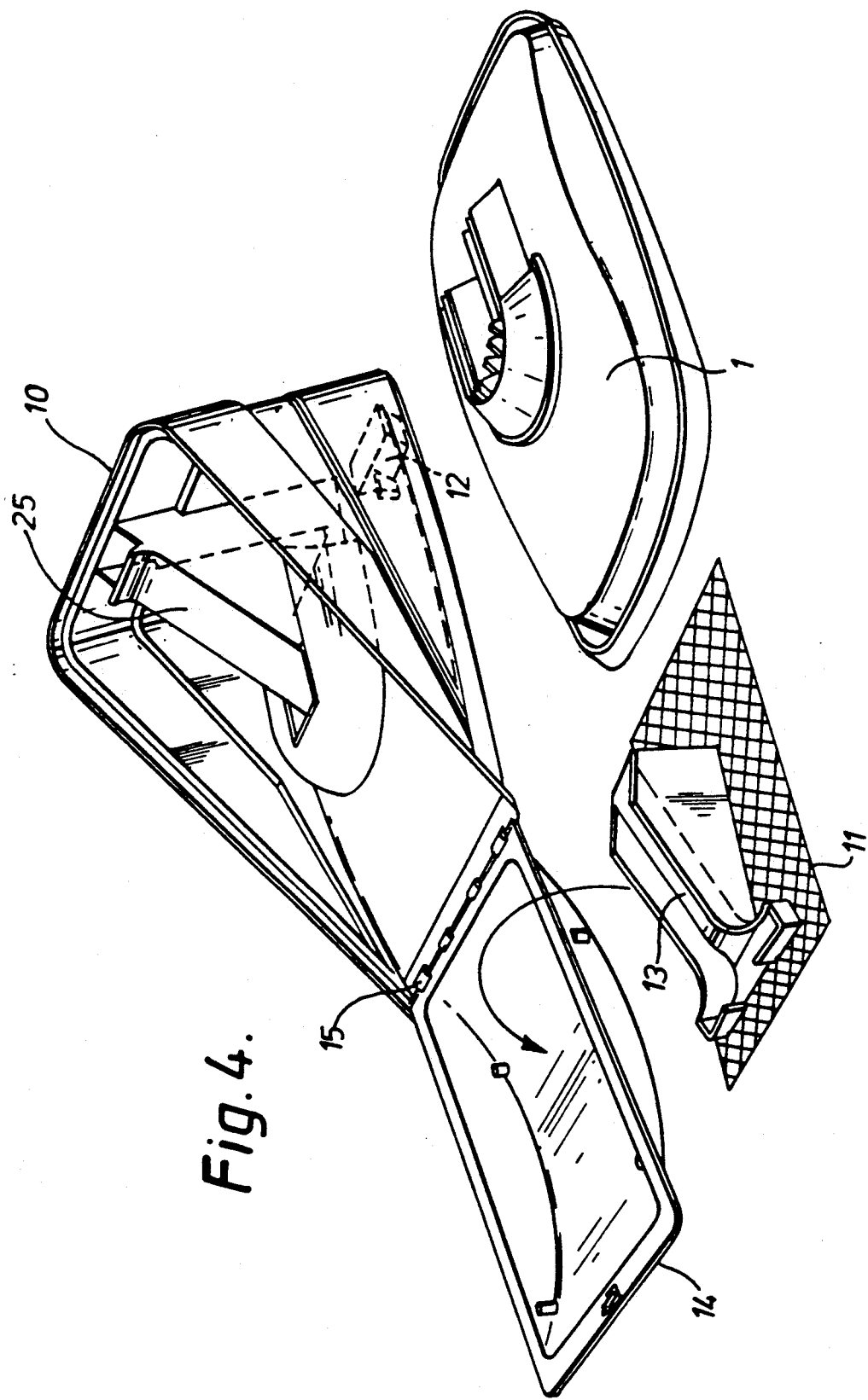

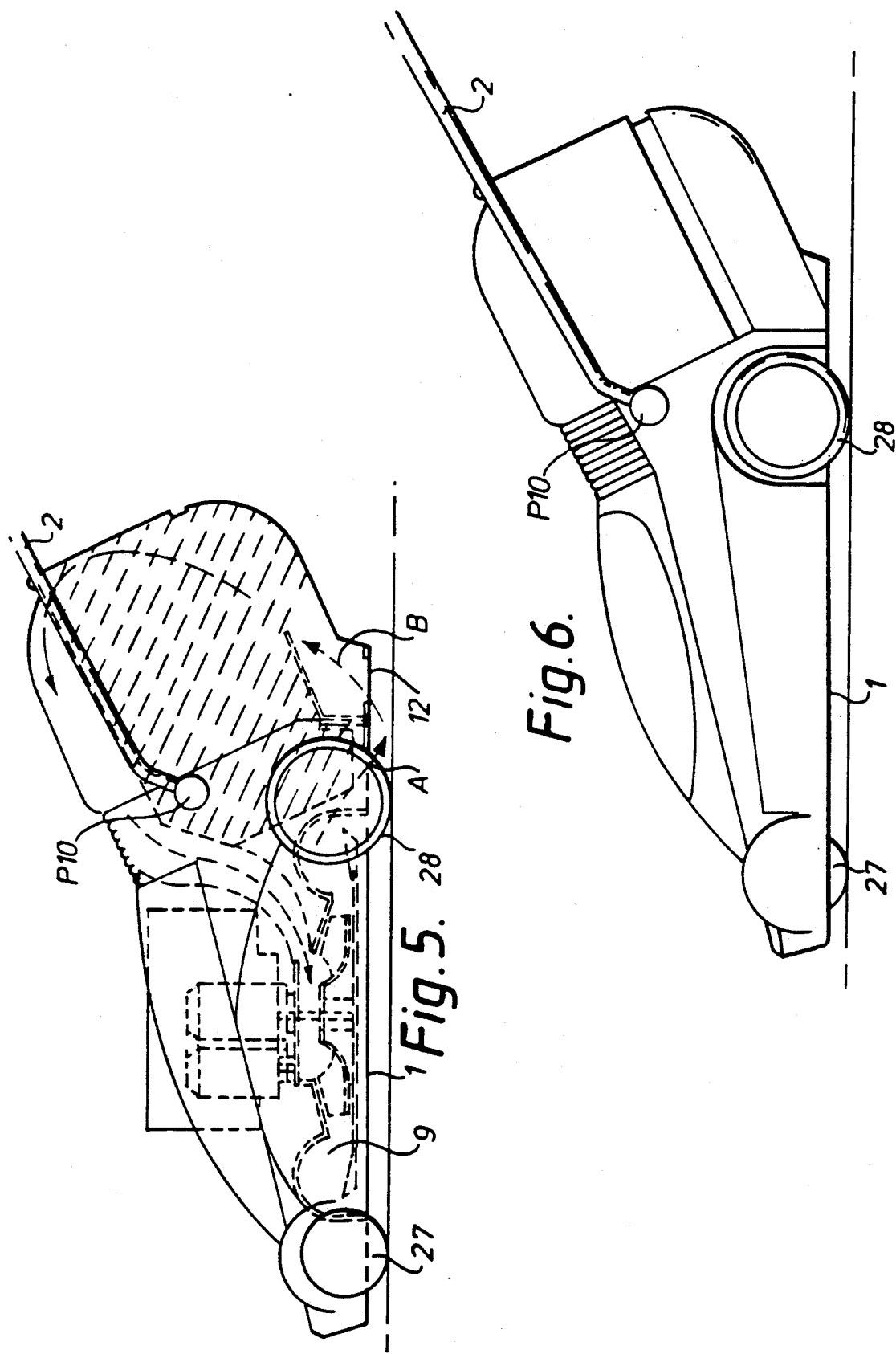

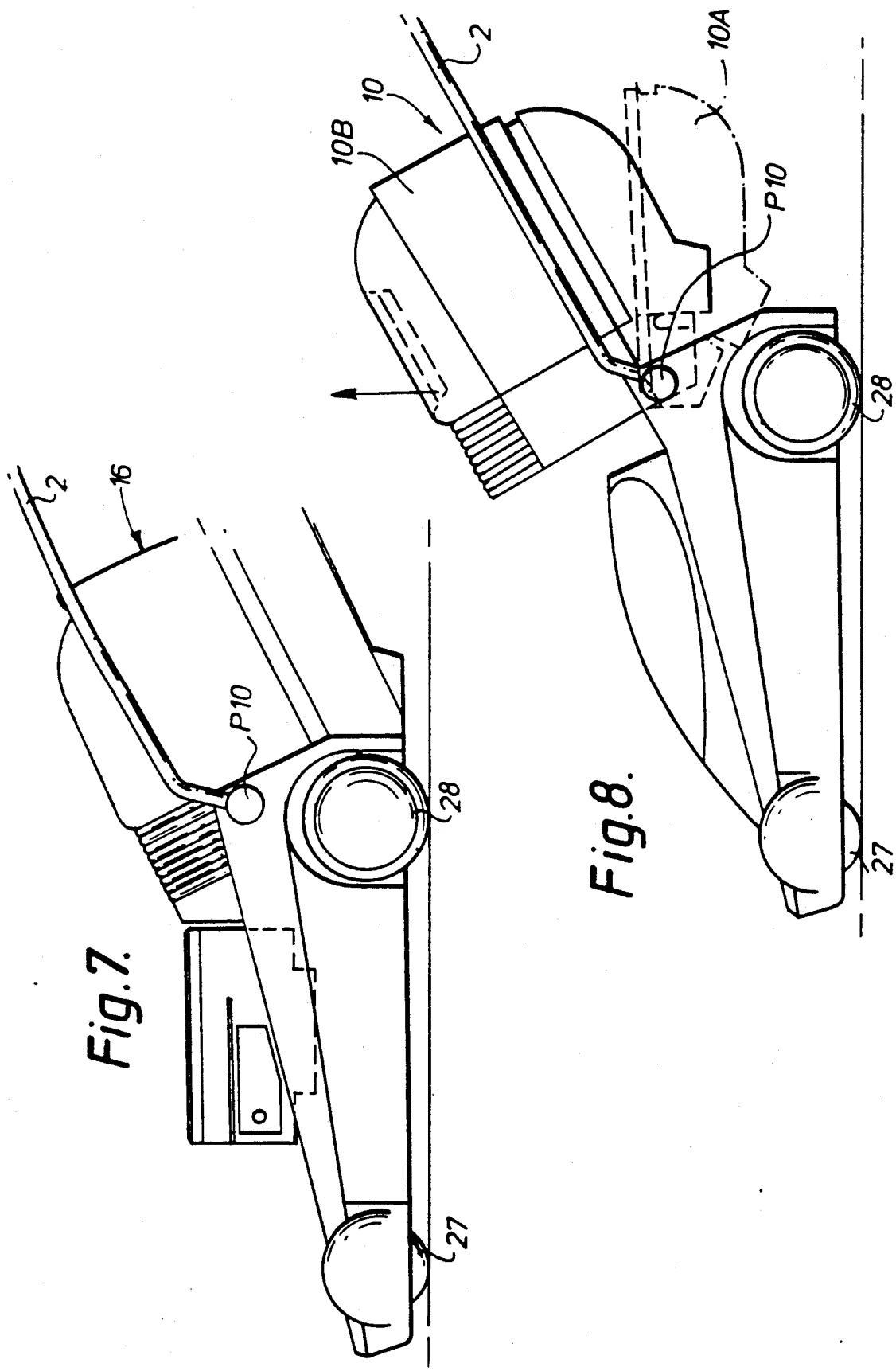

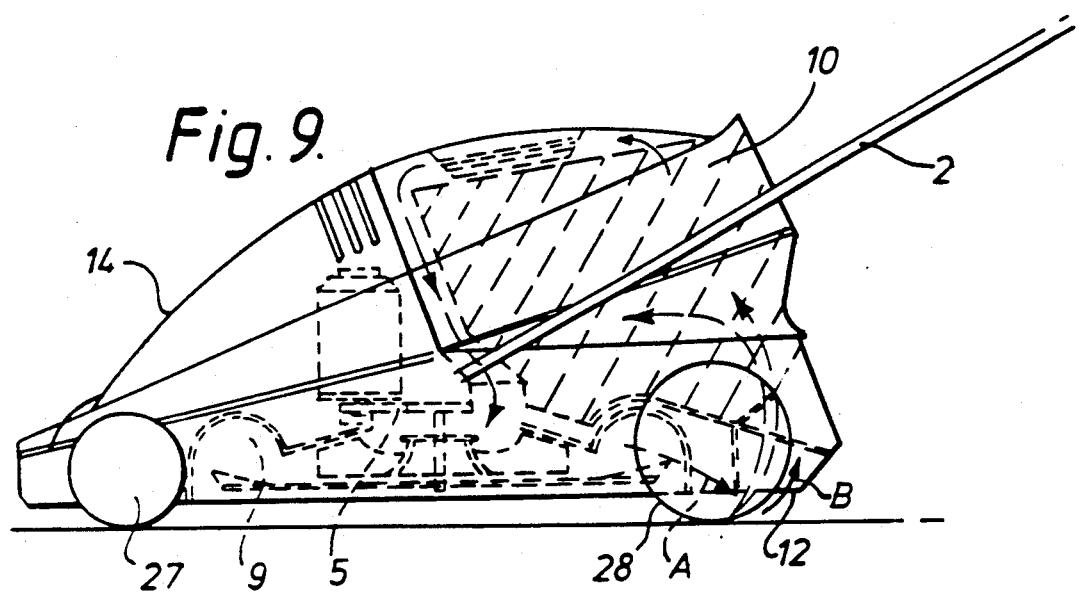

LAWN MOWERS

This invention relates to grass cutting appliances. In particular the invention relates to rotary lawn mowers having one or more cutting blades mounted for rotation during operation about a generally vertical axis. Generally speaking, there are two main categories of rotary lawn mower, namely (1) a hover-type rotary lawn mower which, when operative is supported by a cushion of air, and (2) a rotary mower which is supported on wheels and which may include a rear roller for producing a striped effect on a mown lawn.

Mowers falling under category (1) are manually propelled by a user whereas mowers falling under category (2) may be either manually propelled by a user or propelled by a drive-line taken from a power unit connectable via a clutch to one or more wheels or a roller system. In the latter case the power unit combines the functions of driving the rotatable cutting blade(s) and the mower per se.

Mowers falling within either category may be driven directly or indirectly by either an i/c engine or an electric motor.

It is an object of the present invention to improve the maneuverability of type (1) and type (2) mowers as defined above.

According to a first aspect of the present invention a hover type lawn mower comprises a hood, a cutting member mounted for rotation in a substantially horizontal plane within the hood, a handle for controlling directional movement of the appliance during a cutting operation, a power source disposed remotely from the cutting member and supported from the handle, and a drive line for drivingly connecting the power source and the cutting member. Conveniently, a bladed impeller is mounted within the hood and is drivingly connectable to the power source for producing a cushion of air to support the mower during a cutting operation. Preferably the power source is supported directly or indirectly by the handle and in this way the weight of the power source is disposed aft of the mower per se. Where the power source is carried directly by the handle, the drive line may be located within the handle and drive to the axis of rotation of the cutting member effected by appropriate gearing. Conveniently the handle is pivotally mounted on the hood and the mower includes a removable grass collector. In order to accommodate the handle, the grass collector is preferably slotted to permit arcuate movement in an up and down direction within the collector. The grass collector preferably includes an inlet aperture disposed rearwardly of the hood and through which grass and debris are sucked by a current of air created by the impeller when producing a cushion of air to support the mower. The grass and other debris may be contained within the collector per se or may be led into a removable container supported in spaced relationship within the grass collector box. The removable container may, if desired, be disposable in the manner of a disposable dust collector in a domestic suction carpet cleaner.

According to a second aspect of the present invention which is particularly applicable to the category (2) rotary mower described above, a mower comprises a hood, a cutting member mounted for rotation in a substantially horizontal plane within the hood, a handle for controlling directional movement of the mower during a cutting operation, a power source, a drive line for drivingly connecting the power source and the cutting member, at least one rolling support member for supporting the mower and means for mounting one rolling support member about a substantially vertical axis relative to ground datum and disposed externally of that area ascribed during rotation of the cutting member and thereby serving to assist control of directional movement of the mower during operation. Preferably the rolling support member which is mounted about a substantially vertical axis functions as a castor and is disposed forwardly relative to normal use of the mower and thereby assists in steering the mower during operation. In addition to the castor-like rolling support member, lawn mowers in accordance with the present invention may include rear supporting wheels together with a rear roller in order to product a striped effect on a mown lawn. A grass collecting system similar to that described above may also be mounted on the hood and grass and other debris is sucked into the grass collector as previously described. In order to vary the height of cut of mown grass each rolling support member, including a roller if fitted, includes means for raising or lowering the axis of rotation of the rolling member.

Embodiments of lawn mowers in accordance with the first and second aspects of the present invention are illustrated in the accompanying drawings, in which FIGS. 1, 1A, 1B, 1C, 1D, 2, 3 and 4 are directed to mowers according to the first aspect of the invention, and FIGS. 5, 6, 7, 8, 9, 10 and 11 are directed to mowers according to the second aspect of the invention.

Referring to FIG. 1, a hood 1 in the form of an inverted dish is pivotally connected to lower end 2A of a handle 2. The handle 2 supports an electric motor 3 that is powered by an electric current supplied by a cable 4. The electric motor 3 is connected via a drive line 5, within the handle 2, to a drive shaft 6 on which is mounted a rotatable cutting blade 7 and an impeller 8, both contained within a plenum chamber 9 of the hood 1. A grass box 10 is supported on the hood 1 as shown and includes a filter grid 11, an inlet 12, air outlet 13, a lid 14 hingedly supported at 15 from the hood 1 and a removable container 16 (shown in outline) for collecting cut grass. In use, air is drawn through inlet apertures 17 by the impeller 8 to create a cushion of air to support the mower. In addition air is drawn into the grass box 10 by operation of the impeller 8 through inlet 12, grid 11 and air outlet 13. The suction created within the grass box 10 draws grass cuttings and other debris into the box through inlet 12 where it is collected in the disposable container 16.

Referring to FIG. 1A, (where like components are designated with the same reference numbers as FIG. 1), in addition to drawing debris and grass cutting into the box 10 through inlet 12, debris can be collected while the handle 2 is released by the attachment of a suction hose 18 to an aperture 19 formed on the exterior of the grass box 10 between the air inlet apertures 17 and the grid 11a. When not in use, such an aperture can be sealed with an air-tight cap 20.

Figure 1B:
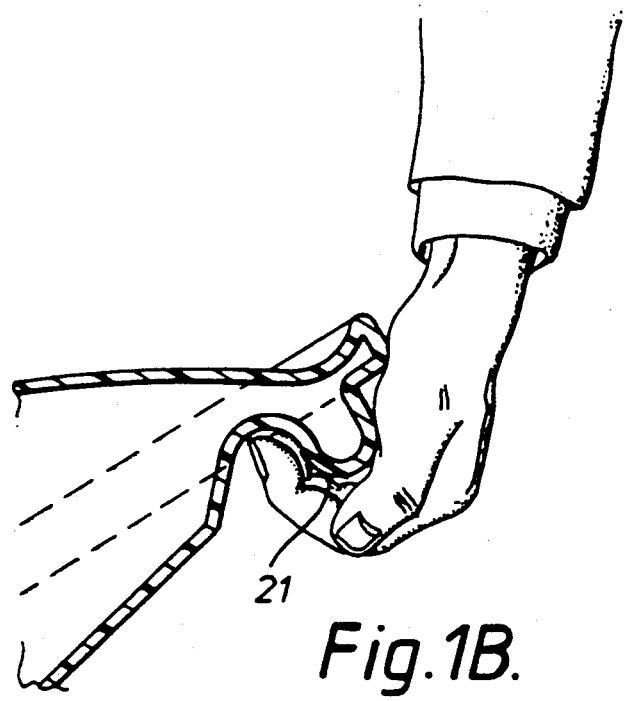

The grass box 10 can be removed from the hood 1 of one mower by hand by gripping the box along the contour 21, as shown more clearly in FIG. 1B.

Figure 1C:
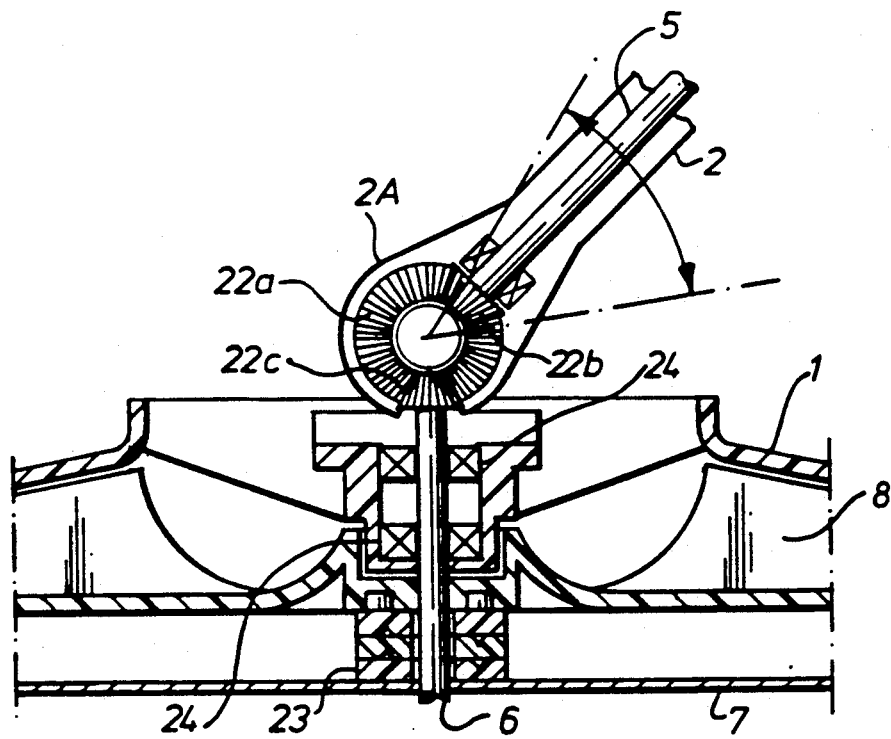

Referring to FIG. 1C, rotational energy from the drive line 5 is transmitted to the drive shaft 6 to a drive the cutting blade and impeller 8 by means of bevel gears 22a, 22b and 22c. Gear 22a is constrained to rotate about the pivotable axis of the handle 2, and gears 22b and 22c are respectively fixed to the drive line 5 and drive shaft 6. The drive shaft 6 is held in substantially vertical alignment by means of washers 24. The height of the cutting blade 7 relative to the ground datum can be varied by inserting or removing spacing discs 23 along the drive shaft 6 between the blade 7 and the impellers.

Figure 1D:
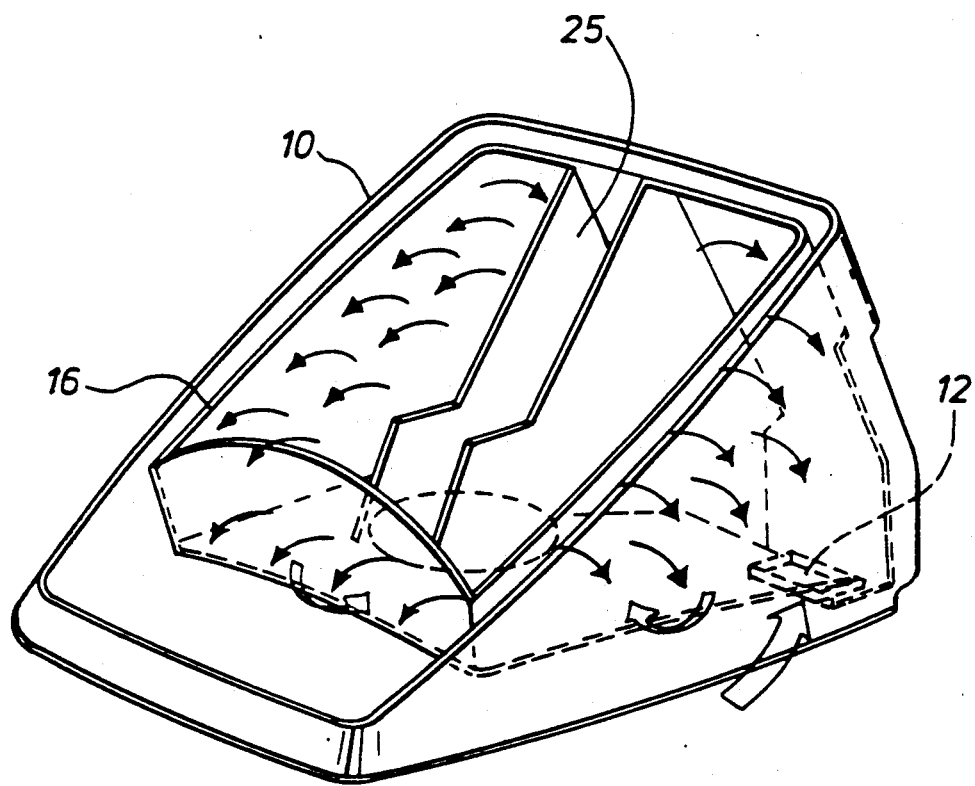
Figure 2:
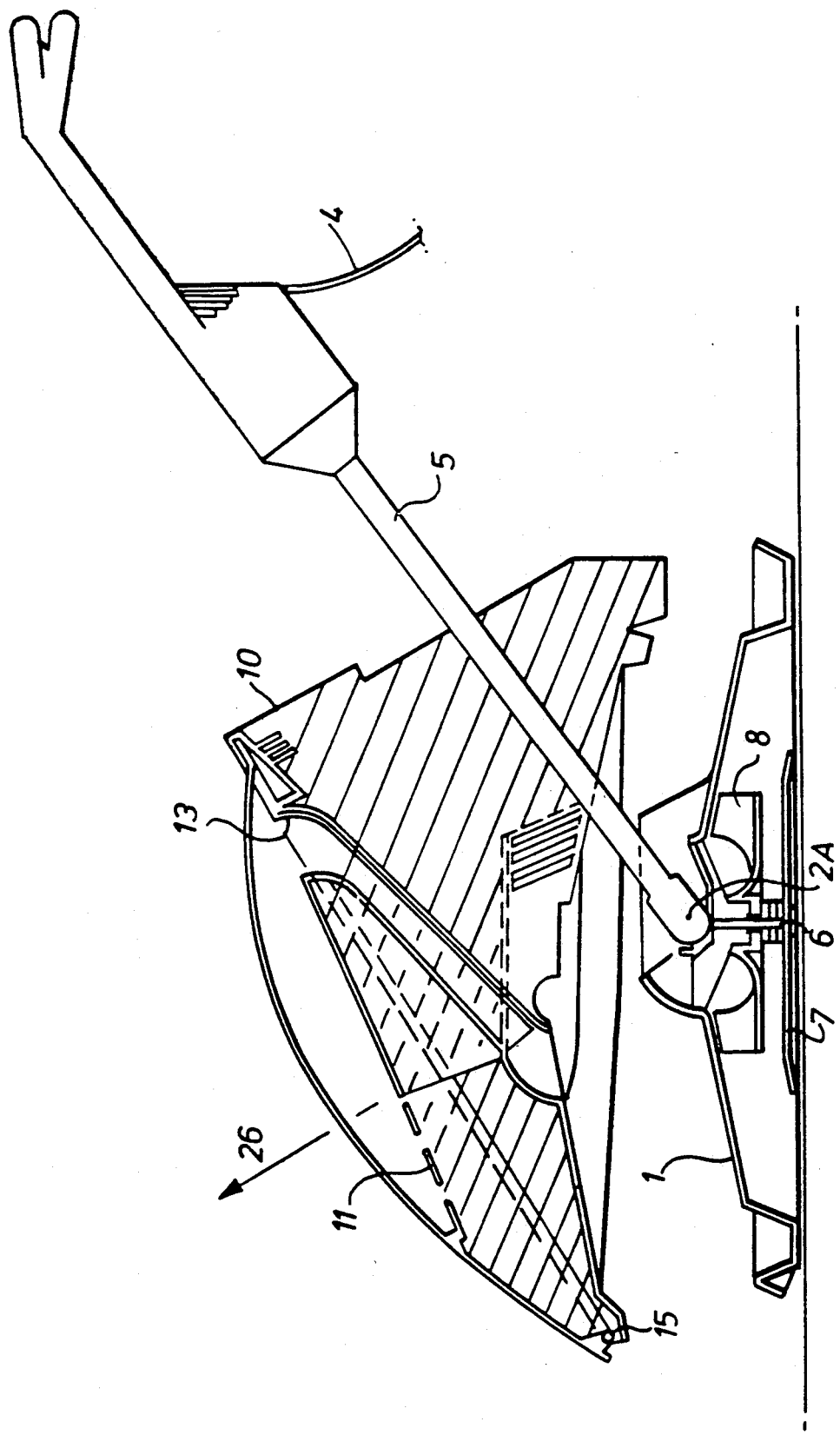

Referring to FIG. 1D, the grass box 10 has a slot 25 (also shown in FIG. 4) in order to accommodate and permit up and down arcurate movement of the handle 2 when the grass box is mounted on the hood 1 of the mower. Air and debis is sucked into the grass box 10 through the inlet aperture 12 disposed rearwardly of the hood 1. Grass cuttings and debris can either be collected in the box 10 itself or in the removable container 16 supported in spaced relationship within the grass collector box 10 as shown. The container 15 is preferably permeable to air, allowing air to flow (as shown) out of it where it can be sucked back into the impeller, and can be of a disposable kind. Referring to FIG. 2, the grass collector box 10 is detached from the hood 1 of the mower in a generally upward direction 26. Collected debris and grass cuttings accumulate within the volume of the box indicated by the hatching.

Figure 3:
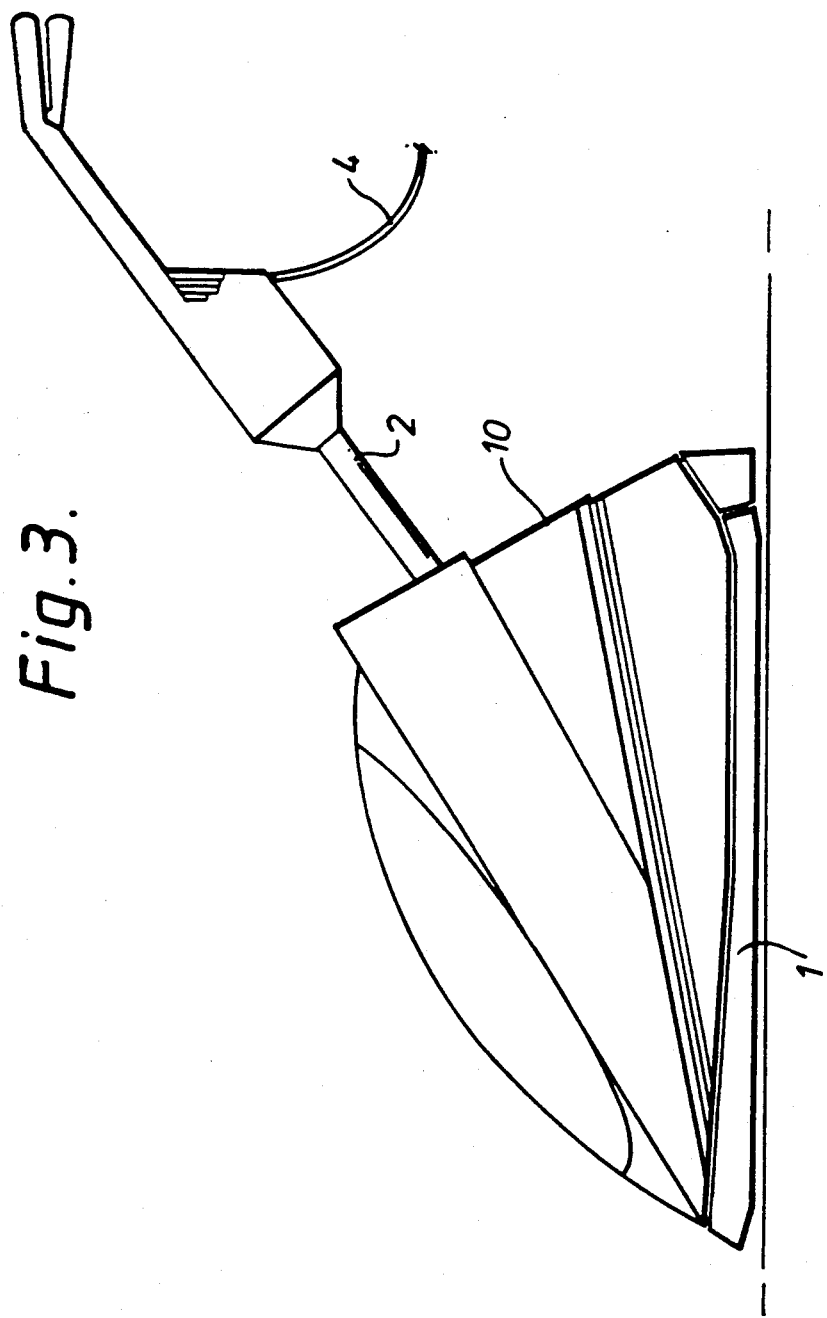

Referring to FIG. 3, the appearance of the mower with the grass collector box 10 mounted on the hood 1 is as shown.

Referring to FIG. 4, the grass box 10 is opened up from the lid 14 enabling cut grass and collected debris and/or removable container to be removed thereform. The grid 11 is inserted into the grass box 10 by first inserting it into the interior of the lid as shown, and then closing the lid. FIG. 5 (where like components are designated with the same reference numbers), shows a further embodiment of the invention in which the mower is supported on forward and rearward wheels, 27 and 28 respectively. To assist maneuverability front wheels 27 may be in the form of conventional casters. In particular, the wheels 28 are disposed outside the plenum chamber 9 of the hood 1, as shown more clearly in FIGS. 5 and 6. In common with our former designs of wheeled or otherwise supported rotary lawn mowers, the plenum chamber 9 of the embodiments of FIGS. 5 to 12 are in the form of a semi toroid from which grass may be directed via a conventional rear chute into the grass collector 16. Alternatively, as shown in FIGS. 5 and 9, mown grass is directed firstly downwardly in the direction of arrow A and thence upwardly by suction in the direction of arrow B into the grass box via inlet 12. The air circulation or suction system is shown by arrows in FIGS. 5 and 9 and operates in substantially the same manner as previously described with reference to FIG. 1.

FIGS. 7/8 illustrate an I/C engine and an electrically powered lawn mower respectively having a two part (10A, 10B) grass collector box 10 which is hinged about the same hinge pivots P10 as control handle 2. Referring to FIG. 8, part 10A is shown in a position from which part 10B containing grass cuttings has been removed.

Figure 10:
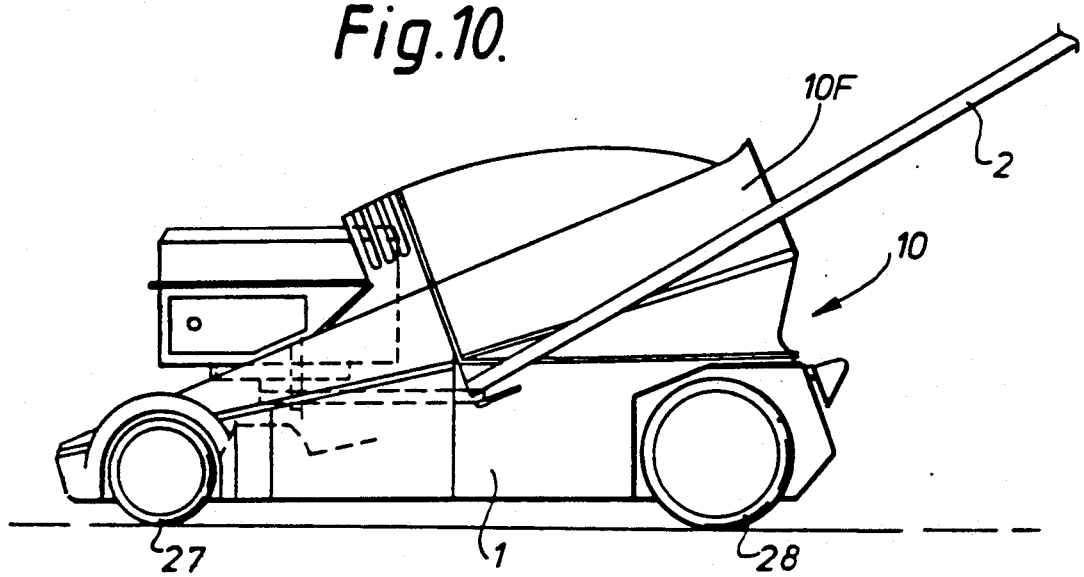
Figure 11:
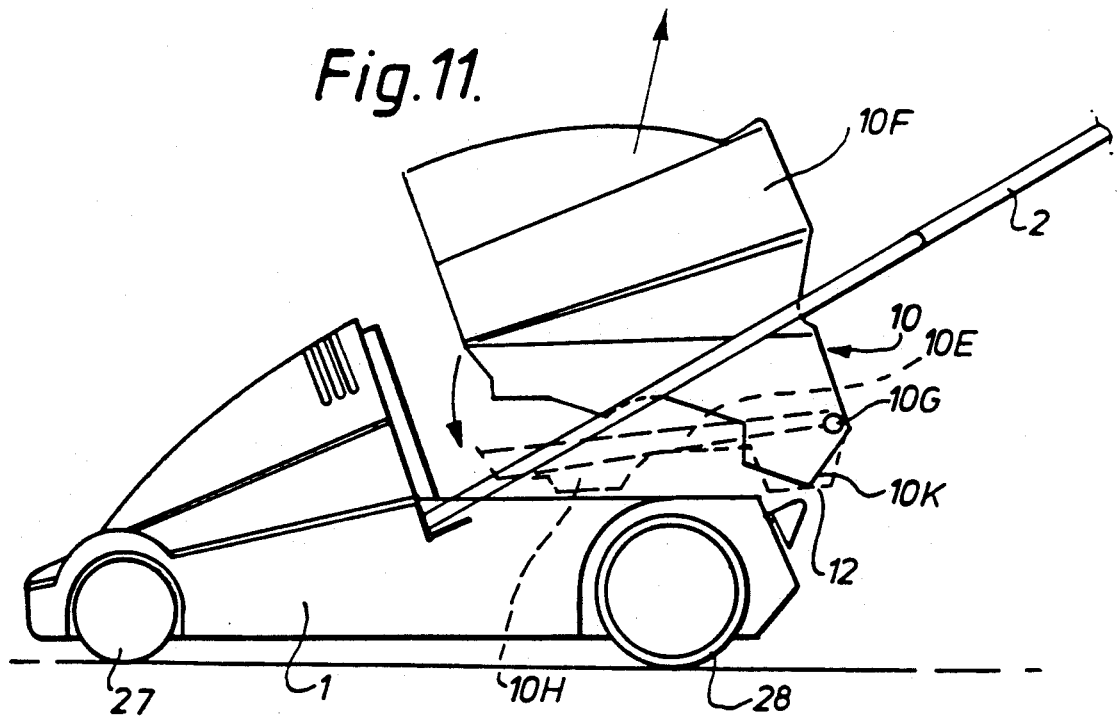

FIGS. 10 and 11 illustrate an I/C engine and an electrically powered lawn mower respectively, having a grass collector box 10B which is hinged as shown as a drop-fit upon the rear portion of the hood 1. In these embodiments, the grass collector 10, which may or may not carry a disposable bag for receiving grass cuttings has a base 10E and a lid 10F pivotally connected at 10G. Moulded projections 10H and 10K serve not only to locate the collector 10 within the hood 1 but also projection 10K includes an inlet 12 for receiving grass cuttings. Alternatively, the inlet 12 may be located within the projection 10H.

I claim:

1. A lawn mower comprising a hood, a cutting member mounted for rotation in a substantially horizontal plane within the hood,
    a handle for controlling directional movement of the appliance during a cutting operation,
    a power source disposed remotely from the cutting member and supported from the handle, and
    a drive line for drivingly connecting the power source and the cutting member.

2. A mower according to claim 1, including a bladed impeller mounted within the hood and drivingly connectable to the power source for producing a cushion of air to support the mower during a cutting operation.

3. A mower according to claim 1 wherein the cutting member and the impeller are coaxially mounted on a common shaft.

4. A mower according to claim 3 wherein the cutting member and the impeller are each driven via the said drive line.

5. A mower according to claim 1 wherein the handle is pivotally attachable to the hood.

6. A mower according to claim 5 wherein the handle includes a tubular member and the said drive line is housed within the tubular member.

7. A mower according to claim 5 wherein the handle is pivotally attachable to the hood in the region of the common shaft.

8. A mower according to claim 1 or claim 2 including a grass collector removably supported on the hood for collecting cut grass.

9. A mower according to claim 8 wherein the hood includes a plenum chamber in which the cutting member and the impeller are supported, and at least one inlet aperture disposed adjacent a peripheral portion of the plenum chamber for leading cut grass into the grass collector.

10. A mower according to claim 8 wherein the grass collector includes a lid hingedly supported from the hood and a removable container for collecting cut grass.

11. A mower according to claim 9 wherein the removable container is a disposable unit and includes means sealingly cooperable with the said at least one inlet aperture.

12. A mower according to claim 11 wherein the said means includes a hollow cone attached to the removable container and the said inlet aperture has a conical shape of similar configuration to that of the hollow cone to sealingly cooperate therewith.

13. A mower according to claim 8 wherein the grass collector includes a slot to accommodate pivotal movement of the handle.

14. A lawn mower comprising a hood, a cutting member mounted for rotation in a substantially horizontal plane within the hood, a handle for controlling directional movement of the mower during a cutting operation, a power source, a drive line for drivingly connecting the power source and the cutting member, at least one rolling support member for supporting the mower, means for mounting one rolling support member about a substantially vertical axis relative to ground datum and disposed externally of that area ascribed during rotation of the cutting member and serving to assist control of directional movement of the mower during operation.

* * * * *